United States Patent
Leng et al.

(10) Patent No.: US 12,306,622 B2
(45) Date of Patent: May 20, 2025

(54) SYSTEM AND METHOD FOR MONITORING FAILURE OF ASSEMBLY TOOLING FOR MASS- INDIVIDUALIZED PRODUCTION LINE

(71) Applicant: GUANGDONG UNIVERSITY OF TECHNOLOGY, Guangzhou (CN)

(72) Inventors: Jiewu Leng, Guangzhou (CN); Xiaofeng Zhu, Guangzhou (CN); Caiyu Xu, Guangzhou (CN); Hongye Su, Guangzhou (CN); Qiang Liu, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 257 days.

(21) Appl. No.: 18/187,698

(22) Filed: Mar. 22, 2023

(65) Prior Publication Data
US 2024/0280982 A1    Aug. 22, 2024

(30) Foreign Application Priority Data
Feb. 16, 2023 (CN) .......................... 202310127659.2

(51) Int. Cl.
G05B 23/02 (2006.01)

(52) U.S. Cl.
CPC ..... G05B 23/0283 (2013.01); G05B 23/0235 (2013.01); *G05B 2223/06* (2018.08)

(58) Field of Classification Search
CPC ...... G05B 19/4065; G05B 2219/37245; G05B 2219/37256; G05B 23/0283;
(Continued)

(56) References Cited

U.S. PATENT DOCUMENTS 6,978,187 B1 * 12/2005 Ryskoski ......... G05B 19/41865
700/100
7,285,400 B2    10/2007 Carulli et al.
(Continued)

FOREIGN PATENT DOCUMENTS

EP       4138007 A1 *  2/2023  ......... G06Q 10/0637

*Primary Examiner* — Catherine T. Rastovski
*Assistant Examiner* — Matthew W. Baca
(74) *Attorney, Agent, or Firm* — True Shepherd LLC; Andrew C. Cheng

(57) ABSTRACT

A system and method for monitoring the failure of assembly tooling for a mass-individualized production line are provided. The system realizes real-time monitoring and prediction of the remaining service life of the assembly tooling in the mass-individualized production line through the cooperation of a manufacturing execution system (MES), a supervisory control and data acquisition (SCADA) system, an assembly tooling failure prediction system, a controller network, and an assembly line. When the remaining service life reaches a certain threshold, the system sends an early warning to an operator, and provides decision support for the operator to replace the assembly tooling. The assembly tooling failure prediction system is built with an assembly tooling failure prediction model for predicting the remaining service life of the assembly tooling in real time, which avoids the influence of human factors and greatly improves the prediction accuracy.

4 Claims, 5 Drawing Sheets

(58) Field of Classification Search
CPC ............ G05B 23/0286; G05B 23/0294; G05B 23/0243; G05B 23/0254; G05B 23/024; G05B 2219/24001; G05B 2219/24019; G05B 2219/32234; G05B 2219/32235; G05B 13/04; G05B 23/0205; G05B 23/0218; G05B 23/0224; G05B 23/0229; G05B 23/0232; G05B 23/0281; G05B 2223/06; G05B 19/418; G05B 19/4184; G05B 19/41865; G05B 19/4187; G05B 2219/31088; G05B 23/0267; G05B 23/0235; G05B 23/0259; G05B 23/027; G05B 23/0272; G05B 23/0289; G05B 23/0291; G06Q 10/0631; G06Q 10/06311; G06Q 10/06312; G06Q 10/06313; G06Q 10/06314; G06Q 10/20; G06Q 10/06; G06N 20/00; Y02P 90/02; Y02P 90/30
See application file for complete search history.

(56) References Cited

U.S. PATENT DOCUMENTS

| | | |
|---|---|---|
| 7,977,472 B2 | 7/2011 | Beigelman et al. |
| 9,260,471 B2 | 2/2016 | Cancilla et al. |
| 2017/0083822 A1* | 3/2017 | Adendorff ............ G06F 11/0793 |
| 2020/0265331 A1* | 8/2020 | Tashman .................. G06N 7/01 |
| 2021/0286325 A1* | 9/2021 | Liu ...................... G05B 13/024 |
| 2023/0026440 A1* | 1/2023 | Schneider ............ G05B 23/024 |
| 2023/0131828 A1* | 4/2023 | Wang ................ G05B 23/0283 |
| | | 702/184 |

\* cited by examiner

SYSTEM AND METHOD FOR MONITORING FAILURE OF ASSEMBLY TOOLING FOR MASS-INDIVIDUALIZED PRODUCTION LINE

CROSS-REFERENCE TO RELATED APPLICATIONS

This application claims priority to Chinese Patent Application No. 202310127659.2 with a filing date of Feb. 16, 2023. The content of the aforementioned application, including any intervening amendments thereto, is incorporated herein by reference.

TECHNICAL FIELD

The present disclosure relates to the technical field of tooling-assisted production and processing, and in particular to a system and method for monitoring the failure of assembly tooling for a mass-individualized production line.

BACKGROUND

With the continuous integration of computer and information technology into industrial production, product design is becoming increasingly modular and product parts are becoming increasingly standardized. At present, some manufacturers support the combination of user-defined standard parts to produce customized products based on user needs. This production mode is called mass-individualized production.

Mass-individualized production often requires the cooperation of multiple production devices, and the device combination required by different customized products may vary, that is, the process sequence may not be the same. In addition, the assembly tooling required for different customized products processed on the same device may also be different. Therefore, to ensure consistency of the quality of various customized products, the mass-individualized production line requires not only a large number of different types of standardized parts and reliable production processes, but also a large number of different types of precision assembly tooling.

Since the mass-individualized production line requires precision assembly tooling, the assembly tooling needs to be replaced in time after its wear reaches a failure threshold. However, the service life of different types of assembly tooling is affected not only by tooling factors such as shape and material, but also by other factors such as the working environment, process flow, loading device and assembled product, which makes it hard to predict the failure time of the assembly tooling.

At present, the mainstream tooling failure monitoring method is still implemented by workers determining the wear and failure status of the tooling based on experience. Specifically, the mainstream tooling failure monitoring method includes the following steps. 1. Whether the product is qualified is determined in the follow-up inspection of the assembly tooling. 2. If the product is unqualified, the production is stopped, and the assembly tooling is taken out to determine the wear of the assembly tooling. 3. The unqualified product assembled with the failed tooling is recovered. 4. The assembly tooling is replaced according to the product requirement. 5. The production line is restarted.

The above tooling failure monitoring method mainly has the following defects:

Firstly, it is subjected to human factors. The working efficiency and accuracy of the worker tend to decrease with the increase in his/her working time, and the determination accuracy of the worker will also be affected by his/her working experience. One with shorter working experience tends to have a greater probability of making mistakes.

Secondly, it costs a lot of manpower and resources. Due to the need to monitor the status of all tooling, each tooling assembly process requires a product inspection station, which requires a lot of labor costs. In addition, the equipment in the corresponding work section needs to be shut down to replace the tooling, and the unqualified product needs to be recovered, wasting a lot of time and material resources.

Finally, it has low monitoring efficiency and poor timeliness. In manual monitoring, the tooling that is about to fail or has failed is often found after the unqualified product is detected. Due to the delay in problem finding, it is hard to monitor the tooling status in real time and predict the failure time of the tooling.

SUMMARY OF PRESENT INVENTION

In order to overcome the shortcomings of the prior art, an objective of the present disclosure is to provide a system for monitoring the failure of assembly tooling for a mass-individualized production line.

To achieve the above objective, the present disclosure provides the following technical solutions.

The system for monitoring failure of assembly tooling for the mass-individualized production line includes a manufacturing execution system (MES), a supervisory control and data acquisition (SCADA) system, an assembly tooling failure prediction system, a controller network, and an assembly line; the assembly line comprises a plurality of stand-alone devices for production and processing; the SCADA system is connected with the assembly line through the controller network, and is configured to acquire, through the controller network, input/output (I/O) information of the stand-alone devices and further integrate the I/O information; the assembly tooling failure prediction system is connected with the SCADA system, is provided with an assembly tooling failure prediction model, and is configured to monitor failure of the assembly tooling in the assembly line based on the information acquired by the SCADA system; and the MES is connected with the assembly tooling failure prediction system and the SCADA system, and is configured to: dynamically formulate a production plan according to real-time status information of the assembly line acquired by the SCADA system and failure prediction information of the assembly tooling acquired by the assembly tooling failure prediction system; and send, by an industrial network communication protocol, a production task to the stand-alone devices through the controller network in the form of I/O information.

Further, multi-source data acquired by the SCADA system includes complex working condition data and tooling health data; the complex working condition data includes device types, tooling parameters, product parameters, rotation speed, moment of force, torque, and pressure; and the tooling health data includes device operation data, tooling failure data, degradation data, and unqualified product data.

Further, the assembly tooling failure prediction system includes a data management center, a data processing module, and a production management module; the data management center is configured to realize rapid data exchange between a local or remote device, a cloud database, and an enterprise server through a switch, and is provided with a firewall to discover a possible security risk and a data transmission problem, so as to prevent internal data leakage and ensure internal data security; the data processing module has a parameter configuration function for the assembly tooling failure prediction model and an assembly tooling failure prediction function, and is configured to: read and access data in the data management center through a standard communication interface, build and train the assembly tooling failure prediction model, and output an assembly tooling failure prediction result to another module through the standard communication interface, so as to realize real-time monitoring and prediction of a tooling status; and the production management module is configured to read multi-source production data, user operation requested data, and tooling failure prediction data through the standard communication interface, and formulate and dynamically update a tooling replacement plan and plans for the stand-alone devices and/or assembly line.

Further, the system includes a user terminal connected with the assembly tooling failure prediction system and configured to: send requests, for example, for adding, viewing, and updating a tooling status, to the assembly tooling failure prediction system through the standard communication interface, and receive and display multi-source production information regarding the assembly tooling, the stand-alone devices, and a product, sent by the assembly tooling failure prediction system.

In order to achieve the above objective, the present disclosure further provides a method for monitoring the failure of assembly tooling for a mass-individualized production line, which is implemented by the above system for monitoring failure for assembly tooling for a mass-individualized production line, and includes:
  acquiring and integrating, by the SCADA system, the I/O information of the stand-alone devices during an operation process of the assembly line through the controller network;
  performing, by the assembly tooling failure prediction system, failure prediction for the assembly tooling for the stand-alone devices through the assembly tooling failure prediction model based on the information acquired by the SCADA system; and
  dynamically formulating, by the MES, a production plan according to real-time status information of the assembly line acquired by the SCADA system and failure prediction information of the assembly tooling acquired by the assembly tooling failure prediction system; and send, by an industrial network communication protocol, a production task to the stand-alone devices through the controller network in the form of I/O information.

Further, the method includes building and optimizing the assembly tooling failure prediction model as follows:
  A1: calling multi-source production data related to predicted assembly tooling as a status data input, including real-time working condition data and historical working condition data; analyzing an input signal, and extracting a feature; and optimizing the selection of performance degradation data of the assembly tooling, so as to realize tooling status monitoring;
  A2: predicting a performance degradation trend and remaining service life of the assembly tooling according to a nonlinear mapping relationship of the performance degradation data of the assembly tooling, so as to complete tooling status analysis;
  A3: independently completing, by a tooling diagnosis and inference engine, an early warning diagnosis for assembly tooling that is about to fail based on prediction results about the performance degradation trend and remaining service life of the assembly tooling, combined with on-site diagnosis data and historical data, and generating a solution;
  A4: evaluating the performance of a current model, including a deviation between the performance degradation trend and remaining service life of the assembly tooling predicted by the model and actual data, as well as the accuracy of status evaluation and failure warning; and
  A5: determining whether the performance of the current model reaches a preset performance threshold; if not, iteratively optimizing the current model according to a model evaluation result, and returning to step A1; and otherwise, outputting a currently optimal assembly tooling failure prediction model to complete model building and optimization.

Further, the method includes: adding, viewing, and updating, by the assembly tooling failure prediction system, and tooling status data; sending an early warning to a user according to the status of the assembly tooling in the assembly line; and pushing an assembly tooling replacement guidance.

Further, the assembly tooling replacement guidance includes: currently completed service life of assembly tooling, predicted remaining service life of assembly tooling, model of current assembly tooling, model of assembly tooling to be loaded, number of loading devices, etc., where the method further includes: when the user replaces, unloads, and loads the assembly tooling according to the tooling replacement guidance: initiating, by the user terminal, a request to add, view, or update a tooling status to the assembly tooling failure prediction system; matching, by the assembly tooling failure prediction system, user permission of the user terminal with a data updating permission; and updating, if the permission match succeeds, the tooling status to the cloud database.

Further, the assembly tooling failure prediction system includes two data acquisition methods: local data acquisition and remote data acquisition;
  the local data acquisition mode includes: acquiring, by the SCADA system and the controller network that cooperate with each other, the I/O information of the stand-alone devices; acquiring multi-source production information of different assembly devices, sensing devices, and monitoring devices in the assembly line; and uploading the acquired information to a cloud storage server from a local server, so as to realize real-time monitoring of local multi-source production data and storage of historical multi-source production data; and
  the remote data acquisition mode includes: acquiring, by the SCADA system and the controller network that cooperate with each other, the I/O information of the stand-alone devices; acquiring the multi-source production information of different assembly devices, sensing devices, and monitoring devices in the assembly line; and uploading the acquired information to the cloud storage server from a field edge gateway, so as to realize real-time monitoring of remote multi-source production data and storage of historical multi-source production data.

Compared with the prior art, the principles and advantages of the present disclosure are as follows:

1. The present disclosure realizes the real-time monitoring and prediction of the remaining service life of the assembly tooling in the mass-individualized production line through the cooperation of the MES, the SCADA system, the assembly tooling failure prediction system, the controller network, and the assembly line. When the remaining service life reaches a certain threshold, the system sends an early warning to the operator, and provides decision support for the operator to replace the assembly tooling, so as to improve the speed and accuracy of the operator to replace the assembly tooling.
2. The assembly tooling failure prediction system is built with the assembly tooling failure prediction model for predicting the remaining service life of the assembly tooling in real time, which avoids the influence of human factors and greatly improves the prediction accuracy.
3. The assembly tooling failure prediction system can conduct local or remote integration testing on all the devices in the mass-individualized assembly line, and realize the interconnection of data and information. The MES dynamically considers the replacement plans of different devices and different assembly tooling according to the real-time status information and device status prediction information of the whole assembly line, and checks whether the assembly tooling replacement plan of each stand-alone device conforms to the production plan and production objectives of the whole assembly line. In this way, the MES constantly improves the tooling replacement plans of stand-alone devices and the production plan of the whole assembly line, so as to improve the production efficiency and production stability of the mass-individualized assembly line.

BRIEF DESCRIPTION OF THE DRAWINGS

To describe the technical solutions in the embodiments of the present disclosure or in the prior art more clearly, the following briefly describes the drawings required for describing the embodiments or the prior art. Apparently, the drawings in the following description show merely some embodiments of the present disclosure, and a person of ordinary skill in the art may still derive other drawings from these drawings without creative efforts.

DETAILED DESCRIPTION OF THE EMBODIMENTS

The present disclosure will be further described below in combination with specific embodiments.

Figure 1:
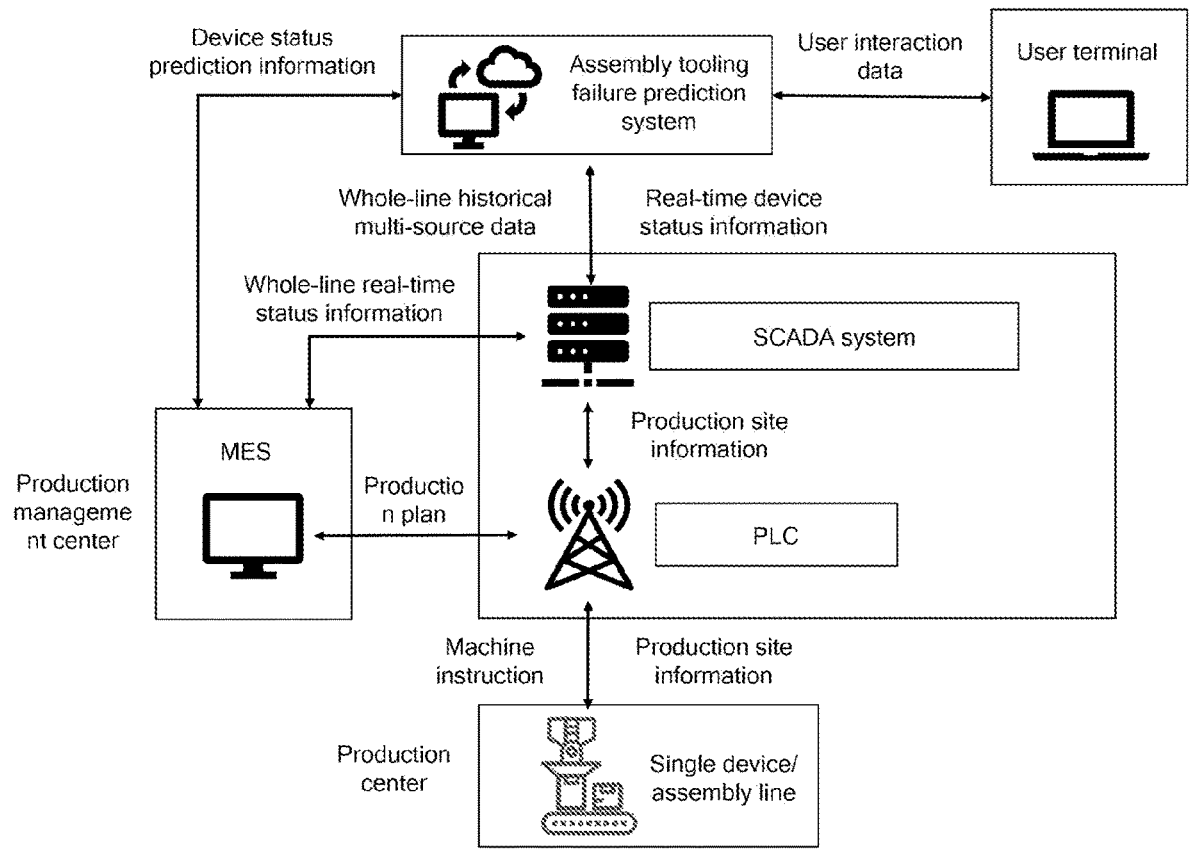
FIG. 1 is a block diagram of a system for monitoring the failure of assembly tooling for a mass-individualized production line according to the present disclosure.

As shown in FIG. 1, this embodiment provides a system for monitoring the failure of assembly tooling for a mass-individualized production line. The system includes a manufacturing execution system (MES), a supervisory control and data acquisition (SCADA) system, an assembly tooling failure prediction system, a controller network, an assembly line, and a user terminal.

The assembly line comprises a plurality of stand-alone devices for production and processing.

The SCADA system is connected with the assembly line through the controller network, and is configured to acquire, through the controller network, input/output (I/O) information of the stand-alone devices and further integrate the I/O information.

The assembly tooling failure prediction system is connected with the SCADA system through a cloud database, is provided with an assembly tooling failure prediction model, and is configured to monitor the failure of the assembly tooling for the stand-alone devices based on the information acquired by the SCADA system.

The MES is connected with the SCADA system, and is configured to: dynamically formulate a production plan according to real-time status information of the assembly line acquired by the SCADA system and failure prediction information of the assembly tooling acquired by the assembly tooling failure prediction system; and send, by an industrial network communication protocol, a production task to the stand-alone devices through the controller network in the form of I/O information.

The user terminal is connected to the assembly tooling failure prediction system, and is configured to: send requests, for example, for adding, viewing, and updating a tooling status, to the assembly tooling failure prediction system.

Specifically, multi-source data acquired by the SCADA system includes complex working condition data and tooling health data.

The complex working condition data includes device types, tooling parameters, product parameters, rotation speed, moment of force, torque, and pressure.

The tooling health data includes device operation data, tooling failure data, degradation data, and unqualified product data.

Figure 2:
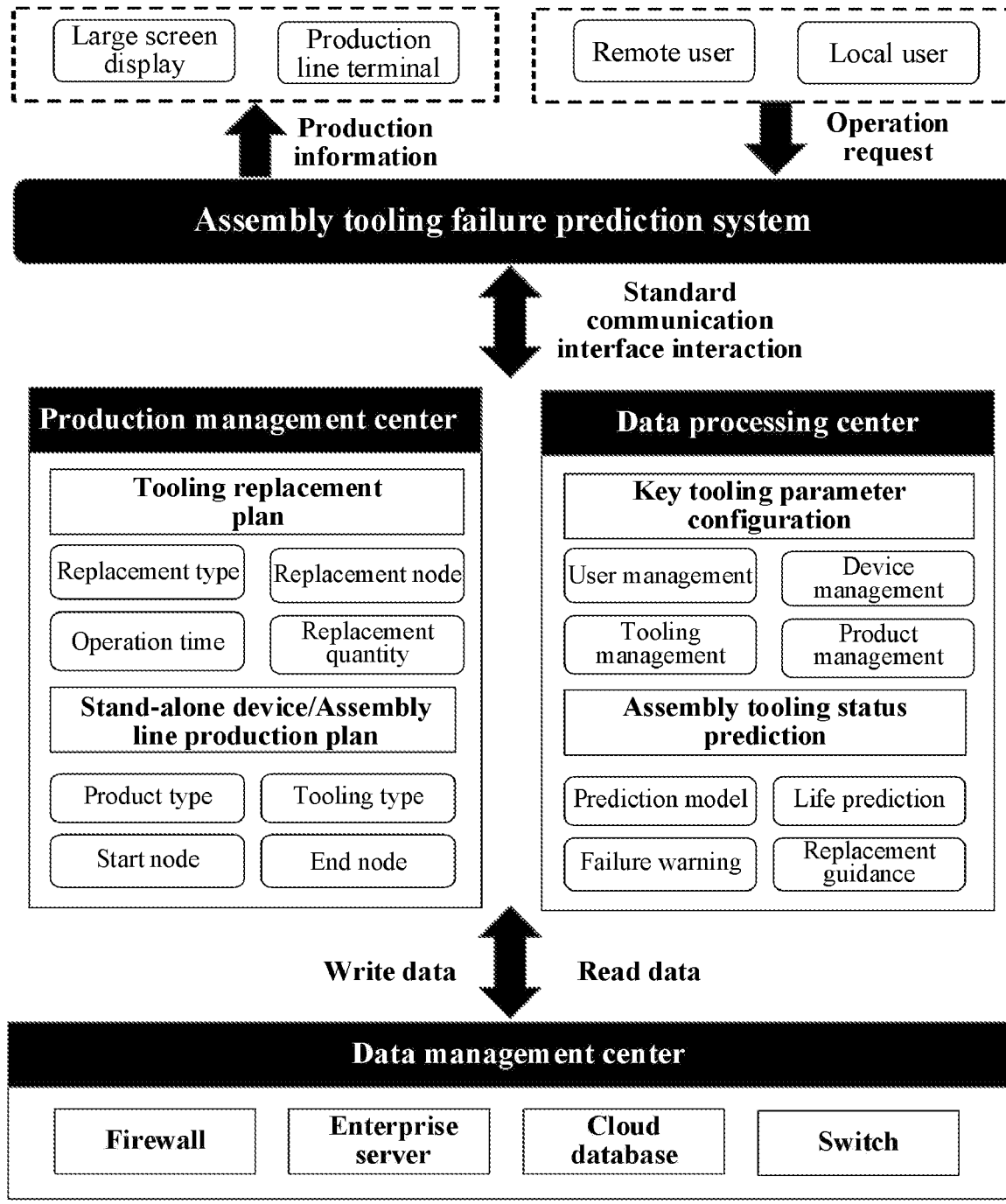
FIG. 2 is a block diagram of an assembly tooling failure prediction system of the system for monitoring the failure of assembly tooling for the mass-individualized production line according to the present disclosure.

Specifically, as shown in FIG. 2, the assembly tooling failure prediction system includes a data management center, a data processing module, and a production management module.

The data management center is configured to realize rapid data exchange between a local or remote device, a cloud database, and an enterprise server through a switch, and is provided with a firewall to discover a possible security risk and a data transmission problem, so as to prevent internal data leakage and ensure internal data security.

The data processing module has a parameter configuration function for the assembly tooling failure prediction model and an assembly tooling failure prediction function, and is configured to: read and access data in the data management center through a standard communication interface, build and train the assembly tooling failure prediction model, and output an assembly tooling failure prediction result to another module through the standard communication interface, so as to realize real-time monitoring and prediction of a tooling status.

The production management module is configured to read multi-source production data, user operation requested data, and tooling failure prediction data through the standard communication interface, and formulate and dynamically update a tooling replacement plan and plans for the stand-alone devices and/or assembly line.

Figure 3:
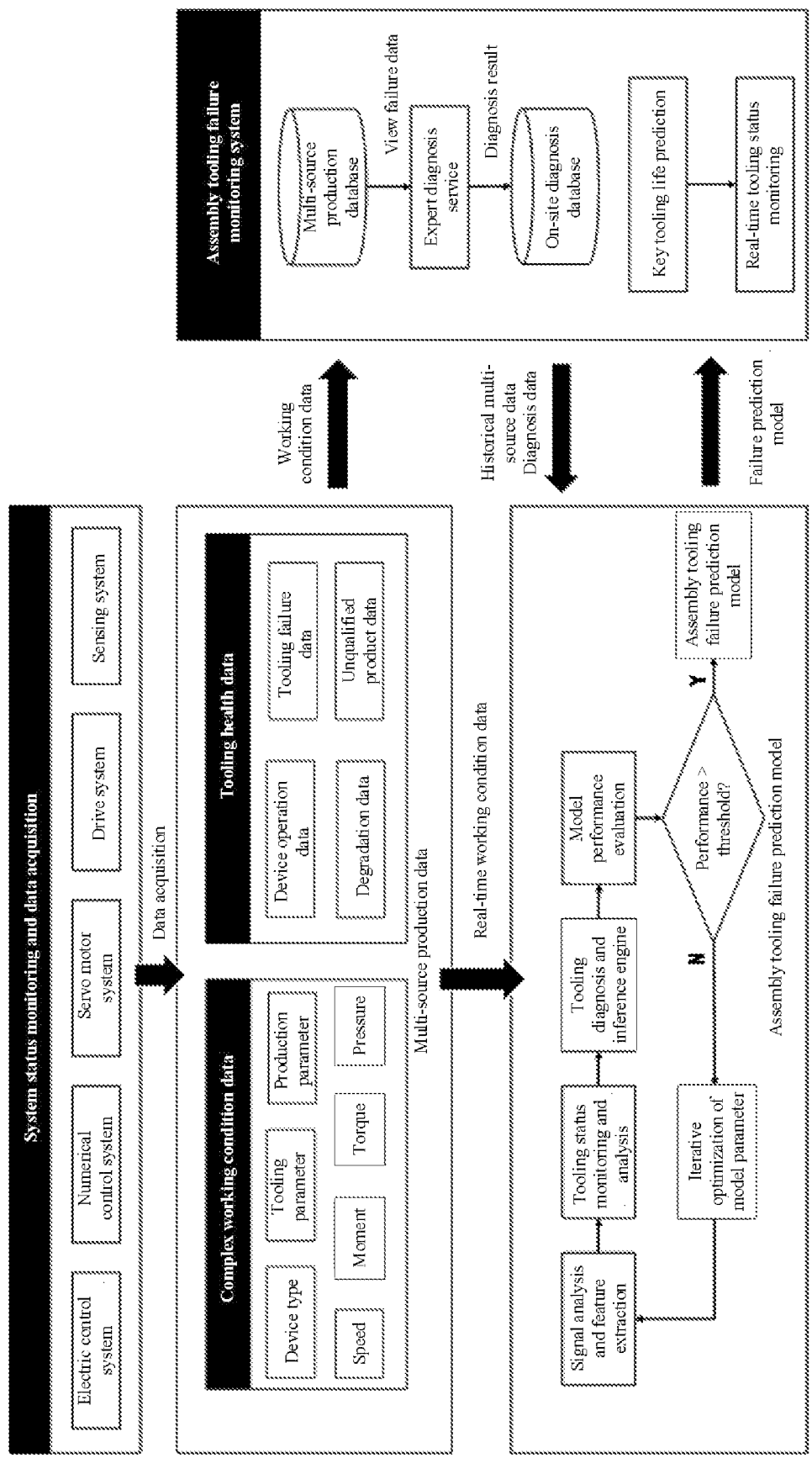
FIG. 3 is a schematic diagram of building and optimizing an assembly tooling failure prediction model according to the present disclosure.

Specifically, as shown in FIG. 3, the assembly tooling failure prediction model is built and optimized as follows:

A1. Multi-source production data related to predicted assembly tooling is called a status data input, including real-time working condition data and historical working condition data; an input signal is analyzed, and a feature is extracted; and selection of performance degradation data of the assembly tooling is optimized, so as to realize tooling status monitoring.

A2. A performance degradation trend and the remaining service life of the assembly tooling are predicted according to a nonlinear mapping relationship of the performance degradation data of the assembly tooling, so as to complete the tooling status analysis.

A3. An early warning diagnosis for assembly tooling that is about to fail is independently completed by a tooling diagnosis and inference engine, based on prediction results about the performance degradation trend and remaining service life of the assembly tooling, combined with on-site diagnosis data and historical data, and a solution is generated.

A4. Performance of a current model is evaluated, including a deviation between the performance degradation trend and the remaining service life of the assembly tooling predicted by the model and actual data, as well as the accuracy of status evaluation and failure warning.

A5. It is determined whether the performance of the current model reaches a preset performance threshold. If not, the current model is iteratively optimized according to a model evaluation result, and the operation returns to step A1. Otherwise, a currently optimal assembly tooling failure prediction model is output to complete model building and optimization.

Figure 4:
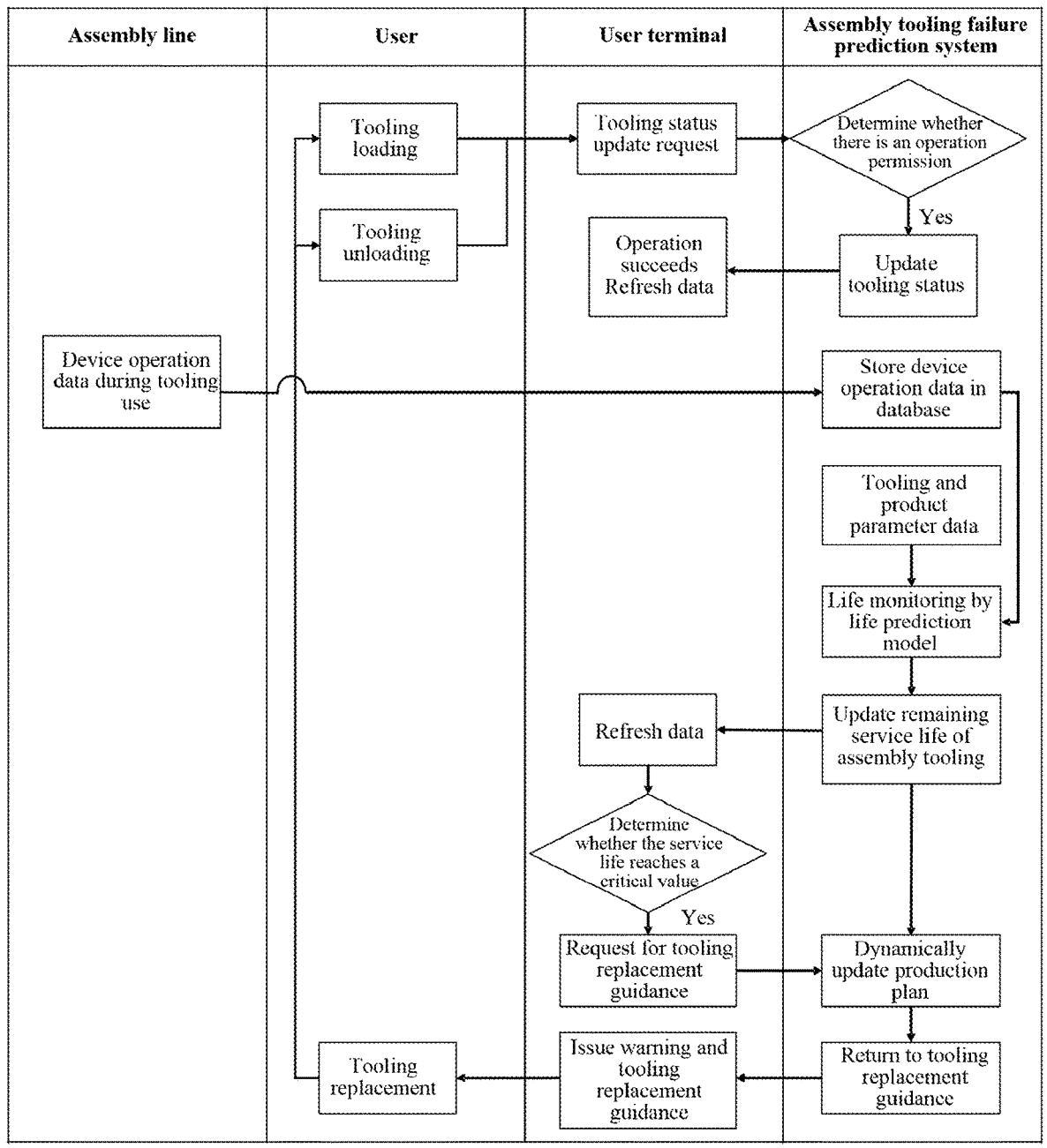
FIG. 4 is a schematic diagram showing the operation of the assembly tooling failure prediction system according to the present disclosure.

Specifically, the operation flow of the system for monitoring the failure of assembly tooling is shown in FIG. 4. The system for monitoring failure of assembly tooling is configured to: perform real-time service life monitoring for assembly tooling; add, view, and update tooling status data; send an early warning to a user according to a status of the assembly tooling of the stand-alone devices; and push an assembly tooling replacement guidance.

The method further includes the following step. When the user replaces, unloads, and loads the assembly tooling according to the tooling replacement guidance, the user terminal initiates a request to add, view, or update a tooling status to the assembly tooling failure prediction system. The assembly tooling failure prediction system matches the user permission of the user terminal with a data updating permission. If the permission match succeeds, the tooling status is updated in the cloud database.

Figure 5:
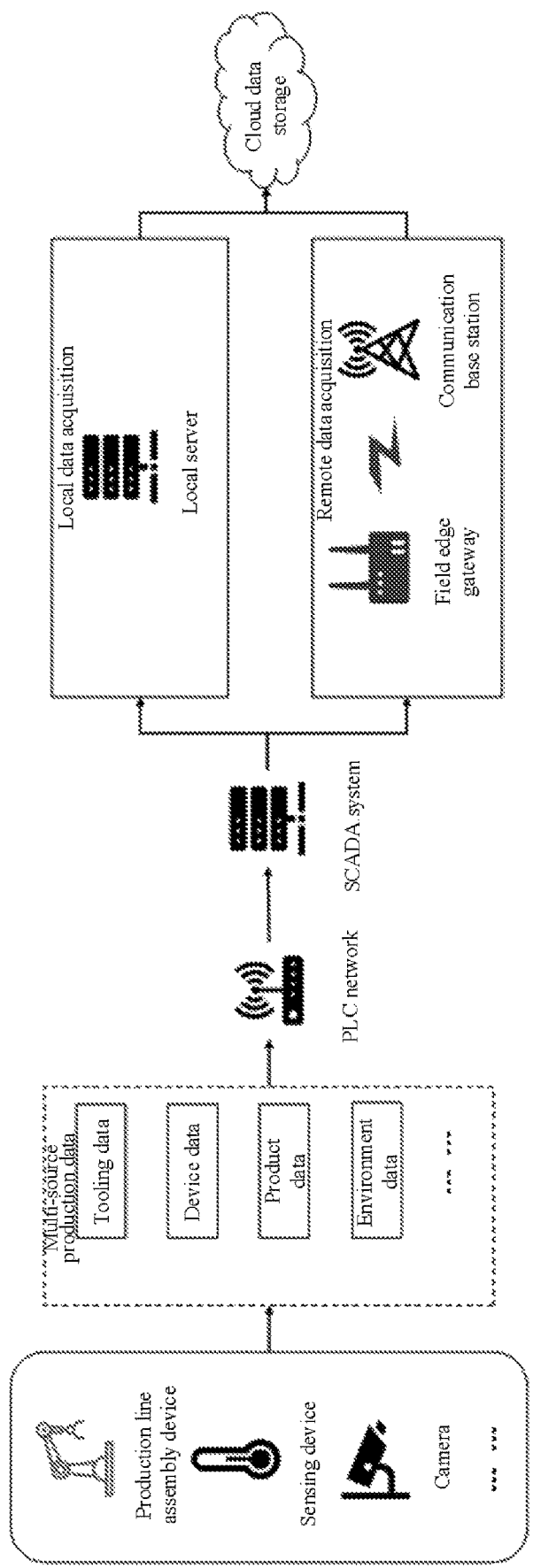
FIG. 5 is a schematic diagram showing local and remote data acquisition performed by the assembly tooling failure prediction system according to the present disclosure.

As shown in FIG. 5, the assembly tooling failure prediction system includes two data acquisition methods: local data acquisition and remote data acquisition.

The local data acquisition mode includes: the SCADA system and the controller network that cooperate with each other to acquire the I/O information of the stand-alone devices, acquire multi-source production information of different assembly devices, sensing devices, and monitoring devices in the assembly line, and upload the acquired information to a cloud storage server from a local server, so as to realize real-time monitoring of local multi-source production data and storage of historical multi-source production data.

The remote data acquisition mode includes: the SCADA system and the controller network that cooperate with each other to acquire the I/O information of the stand-alone devices; acquire the multi-source production information of different assembly devices, sensing devices, and monitoring devices in the assembly line; and upload the acquired information to the cloud storage server from a field edge gateway, so as to realize real-time monitoring of remote multi-source production data and storage of historical multi-source production data.

This embodiment realizes the real-time monitoring and prediction of the remaining service life of the assembly tooling in the mass-individualized production line through the cooperation of the MES, the SCADA system, the assembly tooling failure prediction system, the controller network, and the assembly line. When the remaining service life reaches a certain threshold, the system sends an early warning to the operator, and provides decision support for the operator to replace the assembly tooling. The assembly tooling failure prediction system is built with the assembly tooling failure prediction model for predicting the remaining service life of the assembly tooling in real time, which avoids the influence of human factors and greatly improves the prediction accuracy. The assembly tooling failure prediction system can conduct local or remote integration testing on all the devices in the mass-individualized assembly line, and realize the interconnection of data and information. The MES dynamically considers the replacement plans of different devices and different assembly tooling according to the real-time status information and device status prediction information of the whole assembly line, and checks whether the assembly tooling replacement plan of each stand-alone device conforms to the production plan and production objectives of the whole assembly line. In this way, the MES constantly improves the tooling replacement plans of stand-alone devices and the production plan of the whole assembly line, so as to improve the production efficiency and production stability of the mass-individualized assembly line.

The above described are only preferred embodiments of the present disclosure, and are not intended to limit the implementation scope of the present disclosure. Therefore, all changes made in accordance with the shapes and principles of the present disclosure should fall within the protection scope of the present disclosure.

What is claimed is:

1. A method for monitoring failure of assembly tooling for a mass-individualized production line, wherein a system for monitoring failure of assembly tooling is used, the system comprises: a manufacturing execution system (MES), a supervisory control and data acquisition (SCADA) system, an assembly tooling failure prediction system, a controller network, and an assembly line;

wherein the assembly line comprises a plurality of stand-alone devices for production and processing;

the SCADA system is connected with the assembly line through the controller network, and is configured to acquire, through the controller network, input/output (I/O) information of the stand-alone devices and further integrate the I/O information;

the assembly tooling failure prediction system is connected with the SCADA system, is provided with an assembly tooling failure prediction model, and is configured to monitor failure of the assembly tooling for the stand-alone devices based on the information acquired by the SCADA system; and the MES is connected with the assembly tooling failure prediction system and the SCADA system respectively, and is configured to: dynamically formulate a production plan according to real-time status information of the assembly line acquired by the SCADA system and failure prediction information of the assembly tooling acquired by the assembly tooling failure prediction system; and send, by an industrial network communication protocol, a production task to the stand-alone devices through the Controller network; and the method comprises:

acquiring and integrating, by the SCADA system, the I/O information of the stand-alone devices during an operation process of the assembly line through the controller network;

performing, by the assembly tooling failure prediction system, failure prediction for the assembly tooling for the stand-alone devices through the assembly tooling failure prediction model based on the information acquired by the SCADA system; and dynamically formulating, by the MES, a production plan according to real-time status information of the assembly line acquired by the SCADA system and failure prediction information of the assembly tooling acquired by the assembly tooling failure prediction system; and sending, by an industrial network communication protocol, a production task to the stand-alone devices through the controller network;

building and optimizing the assembly tooling failure prediction model as follows:

A1: calling multi-source production data related to predicted assembly tooling as a status data input, wherein the multi-source production data comprises real-time working condition data and historical working condition data; analyzing the status data input, and extracting a feature; and optimizing selection of performance degradation data of the assembly tooling, so as to realize tooling status monitoring;

A2: predicting a performance degradation trend and remaining service life of the assembly tooling according to a nonlinear mapping relationship of the performance degradation data of the assembly tooling, so as to complete tooling status analysis;

A3: independently completing, by a tooling diagnosis and inference engine, an early warning diagnosis for assembly tooling that is about to fail based on prediction results about the performance degradation trend and remaining service life of the assembly tooling, combined with on-site diagnosis data and historical data, and generating a solution;

A4: evaluating performance of a current model, comprising a deviation between the performance degradation trend and remaining service life of the assembly tooling predicted by the model and actual data, as well as accuracy of status evaluation and failure warning; and A5: determining whether the performance of the current model reaches a preset performance threshold; if not, iteratively optimizing the current model according to a model evaluation result, and returning to step A1; and otherwise, outputting a currently optimal assembly tooling failure prediction model to complete model building and optimization.

2. The method according to claim 1, further comprising: adding, viewing, and updating, by the assembly tooling failure prediction system, tooling status data; sending an early warning to a user according to a status of the assembly tooling in the assembly line; and pushing an assembly tooling replacement guidance, wherein the assembly tooling replacement guidance comprises: currently completed service life of assembly tooling, predicted remaining service life of assembly tooling, model of current assembly tooling, model of assembly tooling to be loaded, and number of loading device.

3. The method according to claim 2, further comprising: when the assembly tooling failure prediction system sends an early warning to the user: replacing, unloading, and loading, by the user, the assembly tooling according to the tooling replacement guidance; initiating, by the user terminal, a request to add, view, or update a tooling status to the assembly tooling failure prediction system; matching, by the assembly tooling failure prediction system, a user permission of the user terminal with a data updating permission; and updating, if the permission match succeeds, the tooling status to the cloud database.

4. The method according to claim 1, wherein the assembly tooling failure prediction system comprises two data acquisition methods: local data acquisition and remote data acquisition;

the local data acquisition mode comprises: acquiring, by the SCADA system and the controller network that cooperate with each other, the I/O information of the stand-alone devices; acquiring multi-source production information of different assembly devices, sensing devices, and monitoring devices in the assembly line; and uploading the acquired information to a cloud storage server from a local server, so as to realize real-time monitoring of local multi-source production data and storage of historical multi-source production data; and the remote data acquisition mode comprises: acquiring, by the SCADA system and the controller network that cooperate with each other, the I/O information of the stand-alone devices; acquiring the multi-source production information of different assembly devices, sensing devices, and monitoring devices in the assembly line; and uploading the acquired information to the cloud storage server from a field edge gateway, so as to realize real-time monitoring of remote multi-source production data and storage of historical multi-source production data.

\* \* \* \* \*